US010712872B2

(12) United States Patent
Sugiyama

(10) Patent No.: US 10,712,872 B2
(45) Date of Patent: Jul. 14, 2020

(54) INPUT APPARATUS AND PROGRAM

(71) Applicant: SHARP KABUSHIKI KAISHA, Sakai, Osaka (JP)

(72) Inventor: Kohichi Sugiyama, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 12 days.

(21) Appl. No.: 16/165,917

(22) Filed: Oct. 19, 2018

(65) Prior Publication Data
US 2019/0121494 A1 Apr. 25, 2019

(30) Foreign Application Priority Data

Oct. 20, 2017 (JP) .................. 2017-203155

(51) Int. Cl.
G06F 3/041 (2006.01)
G06F 3/0488 (2013.01)
G06F 3/0354 (2013.01)
G06F 3/044 (2006.01)

(52) U.S. Cl.
CPC .......... *G06F 3/0418* (2013.01); *G06F 3/0416* (2013.01); *G06F 3/04186* (2019.05); *G06F 3/04883* (2013.01); *G06F 3/03545* (2013.01); *G06F 3/044* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS

2014/0191974 A1* 7/2014 Sako .................. G06K 9/00375
345/168
2017/0300174 A1* 10/2017 Alimian .................. G06F 3/017
2017/0371446 A1 12/2017 Ishikura et al.

FOREIGN PATENT DOCUMENTS

JP H07-306752 A 11/1995
JP 2016-131007 A 7/2016

* cited by examiner

Primary Examiner — Ifedayo B Iluyomade
(74) Attorney, Agent, or Firm — ScienBiziP, P.C.

(57) ABSTRACT

An input apparatus includes a touch-operation detecting unit, a touch-state determining unit, a setting unit, an input-mode determining unit, and a process executing unit. The touch-operation detecting unit detects a touch operation. The touch-state determining unit determines a touch state in the touch operation. The setting unit sets a plurality of input modes in accordance with the touch state, the input modes including at least a first input mode and a second input mode. The input-mode determining unit determines any one input mode from among the set input modes on the basis of the determined touch state. The process executing unit executes an input process on the basis of the detected touch operation in the determined input mode. In a case where the determined input mode is changed by a change in the touch state between a start time of the touch operation and an end time of the touch operation, if the change is from the first input mode to the second input mode, the input process is executed with the first input mode maintained.

17 Claims, 9 Drawing Sheets

FIG. 8

| DENSITY / AREA | LESS THAN 10% | GREATER THAN OR EQUAL TO 10% |
|---|---|---|
| GREATER THAN OR EQUAL TO 300 mm² | ERASE MODE | PALM CANCEL MODE |
| LESS THAN 300 mm² | DRAWING MODE (PEN) | DRAWING MODE (FINGER) |

FIG. 9

| SIGNAL VALUE / AREA | LESS THAN 500 | GREATER THAN OR EQUAL TO 500 AND LESS THAN 2000 | GREATER THAN OR EQUAL TO 2000 |
|---|---|---|---|
| GREATER THAN OR EQUAL TO 300 mm² | INVALID | ERASE MODE | PALM CANCEL MODE |
| LESS THAN 300 mm² | INVALID | DRAWING MODE (PEN) | DRAWING MODE (FINGER) |

SIGNAL VALUE (max16bit = 0 - 65535)

WIDTH dot

| BEFORE CHANGE | AFTER CHANGE | CAN INPUT MODE BE SWITCHED? |
|---|---|---|
| DRAWING MODE | ERASE MODE | YES |
| DRAWING MODE | PALM CANCEL MODE | YES |
| PALM CANCEL MODE | DRAWING MODE | YES |
| PALM CANCEL MODE | ERASE MODE | YES |
| ERASE MODE | DRAWING MODE | YES |
| ERASE MODE | PALM CANCEL MODE | NO |

INPUT APPARATUS AND PROGRAM

BACKGROUND

1. Field

The present disclosure relates to an input apparatus and the like.

2. Description of the Related Art

Input apparatuses including a touch panel have been widely used. In addition, techniques for improving the operability of the touch panel have been proposed.

For example, the following disclosure has been disclosed (see Japanese Unexamined Patent Application Publication No. 7-306752, for example). When a plurality of touch areas of touch operations on a touch panel are detected, touch position information corresponding to a smallest area among the detected plurality of touch areas is selected so as to exclude data that is input by an erroneous operation.

In addition, the following disclosure has been disclosed (see Japanese Unexamined Patent Application Publication No. 2016-131007, for example). It is automatically determined whether a user operation is an erasing operation or an operation other than the erasing operation on the basis of a concentrated degree of detection points on which a touch operation is performed.

SUMMARY

Here, for example, it may be conceived that the disclosure described in Japanese Unexamined Patent Application Publication No. 2016-131007 is applied to a touch panel having a palm cancel function based on Japanese Unexamined Patent Application Publication No. 7-306752. However, while a touch operation is being performed with a plurality of fingers, a change in the gap of fingers may generate a state corresponding to a condition for executing the palm cancel function. In this case, the input in a touch area where the touch operation with fingers is being performed is invalidated.

In this way, the operability has been damaged by invalidating an operation while a user is performing the operation.

It is desirable to provide an input apparatus, for example, that can appropriately execute a user operation by maintaining an input mode even if a touch state is changed while a user is continuously performing a touch operation.

An input apparatus according to an embodiment of the present disclosure includes a touch-operation detecting unit that detects a touch operation; a touch-state determining unit that determines a touch state in the touch operation; a setting unit that sets a plurality of input modes in accordance with the touch state, the input modes including at least a first input mode and a second input mode; an input-mode determining unit that determines any one input mode from among the set input modes on the basis of the determined touch state; and a process executing unit that executes an input process on the basis of the detected touch operation in the determined input mode. In a case where the determined input mode is changed by a change in the touch state between a start time of the touch operation and an end time of the touch operation, if the change is from the first input mode to the second input mode, even after the change in the input mode, the process executing unit maintains the first input mode and executes the input process in the first input mode.

An input apparatus according to an embodiment of the present disclosure includes a touch-operation detecting unit that detects a touch operation; a touch-state determining unit that determines a touch state in the touch operation; a setting unit that sets a plurality of input modes in accordance with the touch state, the input modes including at least a first input mode and a second input mode; an input-mode determining unit that determines any one input mode from among the set input modes on the basis of the determined touch state; and a process executing unit that executes an input process on the basis of the detected touch operation in the determined input mode. In a case where, between a start time of a touch operation detected by the touch-operation detecting unit at a first position and an end time of the touch operation, a new touch operation is detected at a second position that is away from the first position, if it is determined that the input modes are the first input mode at the first position and the second input mode at the second position, even after the detection of the new touch operation, the process executing unit maintains the first input mode and executes the input process in the first input mode.

An input apparatus according to an embodiment of the present disclosure includes a touch-operation detecting unit that detects a touch operation; and an input-mode determining unit that detects a touch state on the basis of the detected touch operation and determines any one input mode from among a plurality of input modes on the basis of the touch state. If the touch state is changed while the touch operation is being detected, the input-mode determining unit maintains the determined input mode.

An input apparatus includes a touch-operation detecting unit that detects a touch operation; and an input-mode determining unit that detects a touch state on the basis of the detected touch operation and determines any one input mode from among a plurality of input modes on the basis of the touch state. If a new touch state is detected at a portion that is different from a portion where the touch operation has been detected while the touch operation is being detected, the input-mode determining unit maintains the determined input mode.

A program according to an embodiment of the present disclosure is a program for causing a computer to execute a touch-operation detecting function that detects a touch operation; a touch-state determining function that determines a touch state in the touch operation; a setting function that sets a plurality of input modes in accordance with the touch state, the input modes including at least a first input mode and a second input mode; an input-mode determining function that determines any one input mode from among the set input modes on the basis of the determined touch state; and a process executing function that executes an input process on the basis of the detected touch operation in the determined input mode. In a case where the determined input mode is changed by a change in the touch state between a start time of the touch operation and an end time of the touch operation, if the change is from the first input mode to the second input mode, even after the change in the input mode, the first input mode is maintained, and the input process in the first input mode is executed.

A program according to an embodiment of the present disclosure is a program for causing a computer to execute a touch-operation detecting function that detects a touch operation; a touch-state determining function that determines a touch state in the touch operation; a setting function that sets a plurality of input modes in accordance with the touch state, the input modes including at least a first input mode and a second input mode; an input-mode determining function that determines any one input mode from among the set input modes on the basis of the determined touch state; and a process executing function that executes an input process on the basis of the detected touch operation in the determined input mode. In a case where, between a start time of a touch operation detected by the touch-operation detecting function at a first position and an end time of the touch operation, a new touch operation is detected at a second position that is away from the first position, if it is determined that the input modes are the first input mode at the first position and the second input mode at the second position, even after the detection of the new touch operation, the first input mode is maintained, and the input process in the first input mode is executed.

A program according to an embodiment of the present disclosure is a program for causing a computer to execute a touch-operation detecting function that detects a touch operation; and an input-mode determining function that detects a touch state on the basis of the detected touch operation and determines a plurality of input modes on the basis of the touch state. If the touch state is changed while the touch operation is being detected, the input-mode determining function maintains the determined input mode.

A program according to an embodiment of the present disclosure is a program for causing a computer to execute a touch-operation detecting function that detects a touch operation; and an input-mode determining function that detects a touch state on the basis of the detected touch operation and determines a plurality of input modes on the basis of the touch state. If a new touch state is detected at a portion that is different from a portion where the touch operation has been detected while the touch operation is being detected, the input-mode determining function maintains the determined input mode.

BRIEF DESCRIPTION OF THE DRAWINGS

FIG. 8 is a diagram illustrating a fifth embodiment;

FIG. 9 is a diagram illustrating a sixth embodiment;

DESCRIPTION OF THE EMBODIMENTS

Now, embodiments for implementing the present disclosure will be described with reference to the drawings. Note that each of the embodiments will describe, as an example, a case in which an input apparatus according to the embodiment of the present disclosure is applied to a display apparatus that is integrated with a touch panel for the sake of description. However, it is needless to say that the input apparatus is applicable to any apparatus as long as an operation input by a user can be detected.

1. First Embodiment

1.1. Functional Configuration

Figure 1:
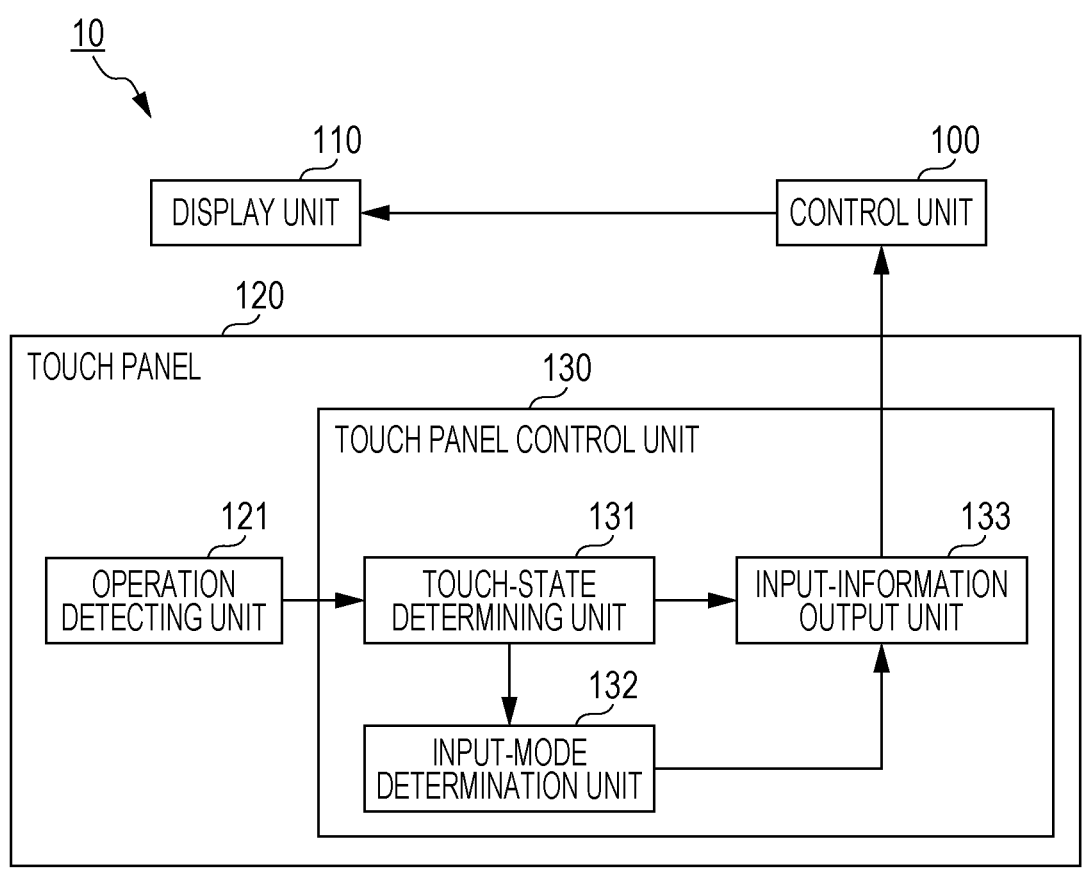
FIG. 1 is a diagram illustrating a functional configuration of a display apparatus according to a first embodiment.

A functional configuration of a display apparatus 10 will be described with reference to FIG. 1. The display apparatus 10 includes a control unit 100, a display unit 110, and a touch panel 120. Note that the display apparatus 10 is preferably assumed to be a stationary display apparatus to be used as an electronic blackboard or the like, but may be any apparatus on which a touch operation can be performed, such as a tablet or a smartphone.

The control unit 100 is a functional unit for controlling the entire display apparatus 10. The control unit 100 implements various functions by reading and executing various programs, and is constituted by, for example, a central processing unit (CPU) or the like.

The display unit 110 is a functional unit for displaying various information items for a user or for drawing an object. For example, the display unit 110 is constituted by a liquid crystal display (LCD), an organic electroluminescent display (OLED), or the like.

The touch panel 120 includes an operation detecting unit 121 and a touch panel control unit 130. The touch panel control unit 130 includes a touch-state determining unit 131, an input-mode determining unit 132, and an input-information output unit 133. The touch panel control unit 130 further includes a recording unit (not illustrated) in which information regarding input modes corresponding to various touch states is recorded as setting information.

The operation detecting unit 121 is a functional unit for detecting a user operation. For example, the operation detecting unit 121 is constituted by a touch panel or the like that is integrally constituted with the display unit 110. The operation may be detected by any method, such as a capacitive sensing method, a pressure sensing method such as a resistive film method, an infrared method, or an electromagnetic induction method.

The touch-state determining unit 131 is a functional unit for determining a touch state on the basis of a user's touch operation (touch point or input point at which a touch operation has been performed) detected by the operation detecting unit 121. In addition, by periodically (e.g., per five milliseconds) detecting the input point, the touch-state determining unit 131 can periodically detect a change in the number of input points or movement of the input points.

On the basis of the input points, the user's touch state is determined. The touch state is determined on the basis of the density, area, distance, or the like of the input points. In addition, an operation in a continuous touch (state) enables detection of various operations such as a swipe and a flick as the touch operation.

The input-mode determining unit 132 is a functional unit for determining an input mode on the basis of the touch state detected by the touch-state determining unit 131. An input state is determined on the basis of the touch state detected by the touch-state determining unit 131 and setting information recorded in the recording unit, and an input mode corresponding to the input state is determined.

Here, the input mode according to this embodiment includes a drawing mode (pen-input mode), an erase mode, and a palm cancel mode. In the drawing mode, an object such as a figure, a character, or a sign can be input with a finger, a pen, or the like. In the erase mode, an object such as a point, a line, or a character, which is a drawing object drawn in a predetermined region, is erased in accordance with the touch state. In the palm cancel mode, the user's erroneous input (a region in which a palm is touched) is invalidated. The input mode may be divided to other modes.

The input mode is determined in accordance with the touch state determined on the basis of the number, density, or area of input points. For example, in a case where the density of three or more input points becomes greater than or equal to a first determination threshold, it is determined that the input mode is the palm cancel mode; in a case where the density of three or more input points becomes less than the first determination threshold, it is determined that the input mode is the erase mode.

Various settings can be set for such determination. For example, in a case where a determination threshold is the area, the following setting is possible:

Greater than or equal to a second determination threshold: Palm cancel mode

Greater than or equal to the first determination threshold and less than the second determination threshold: Erase mode Less than the first determination threshold: Drawing mode The determination threshold may be the distance, area, or density of the input points. In addition, whether or not input points are present within a predetermined radius may be used as the threshold.

The erase mode can alternatively be realized by using an eraser apparatus such as a blackboard eraser. In this case, the eraser apparatus includes conductive members, and the conductive members are arranged at a predetermined interval. This interval serves as an interval for determining the erase mode.

A condition for determining the erase mode may be set by a user or may be set in advance in the display apparatus 10. In addition, in a case of using the eraser apparatus, the condition may be set on the basis of the eraser apparatus. For example, in a case where three conductive buffer members are arranged at a predetermined interval (e.g., 25 mm) in the eraser apparatus, if three or more input points are present within a circle whose radius equals to a length (e.g., 50 mm) within which all the conductive buffering members can be included, it may be determined that the input mode is the erase mode.

The input-information output unit 133 outputs, to the control unit 100, information (input information) based on the input points detected by the touch-state determining unit 131 and the input mode determined by the input-mode determining unit 132. For example, in a case where it is determined that the input mode is the drawing mode, information indicating that the input mode is the drawing mode and information of, for example, coordinates for drawing a line connecting the input points are output to the control unit 100. In addition, in a case where it is determined that the input mode is the erase mode, information indicating that the input mode is the erase mode and information such as the coordinates of a rectangle including the input points and the height and width of the rectangle are output to the control unit 100.

Here, if it is determined that a predetermined region is touched by a palm, it is determined that the input mode is the palm cancel mode, and the input-information output unit 133 performs control so as not to output the coordinates of this touch region and a peripheral region of the touch region to the control unit 100 (palm cancel function). Note that the region touched by the palm and the peripheral region thereof are referred to as a dead region. That is, a touch operation in the dead region is not output from the input-information output unit 133 to the control unit 100. Thus, the touch operation is invalid.

By using the palm cancel function, even if an operation is performed with a stylus on the touch panel that is being touched by a palm, a drawing operation based on the coordinates of the stylus is only valid. Thus, the display apparatus 10 becomes more convenient.

Examples of the method for determining whether a touch operation is performed by a palm in the predetermined region include the following. In a case where three or more input points are included in a circle whose center is a specific input point and whose radius is 10 mm, it may be determined that the region in the circle (region of about 300 mm$^2$) is touched. That is, if there is a region in which the density of input points is extremely high, the region is regarded as being touched by a palm.

Note that the setting as to the condition for validating the palm cancel function, the size of the dead region, or whether to use the palm cancel function may be set by a user or may be set in advance in the display apparatus 10. In this embodiment, the description is given on the assumption that the display apparatus 10 includes the above-described palm cancel function.

1.2. Process Flow

Figure 2:
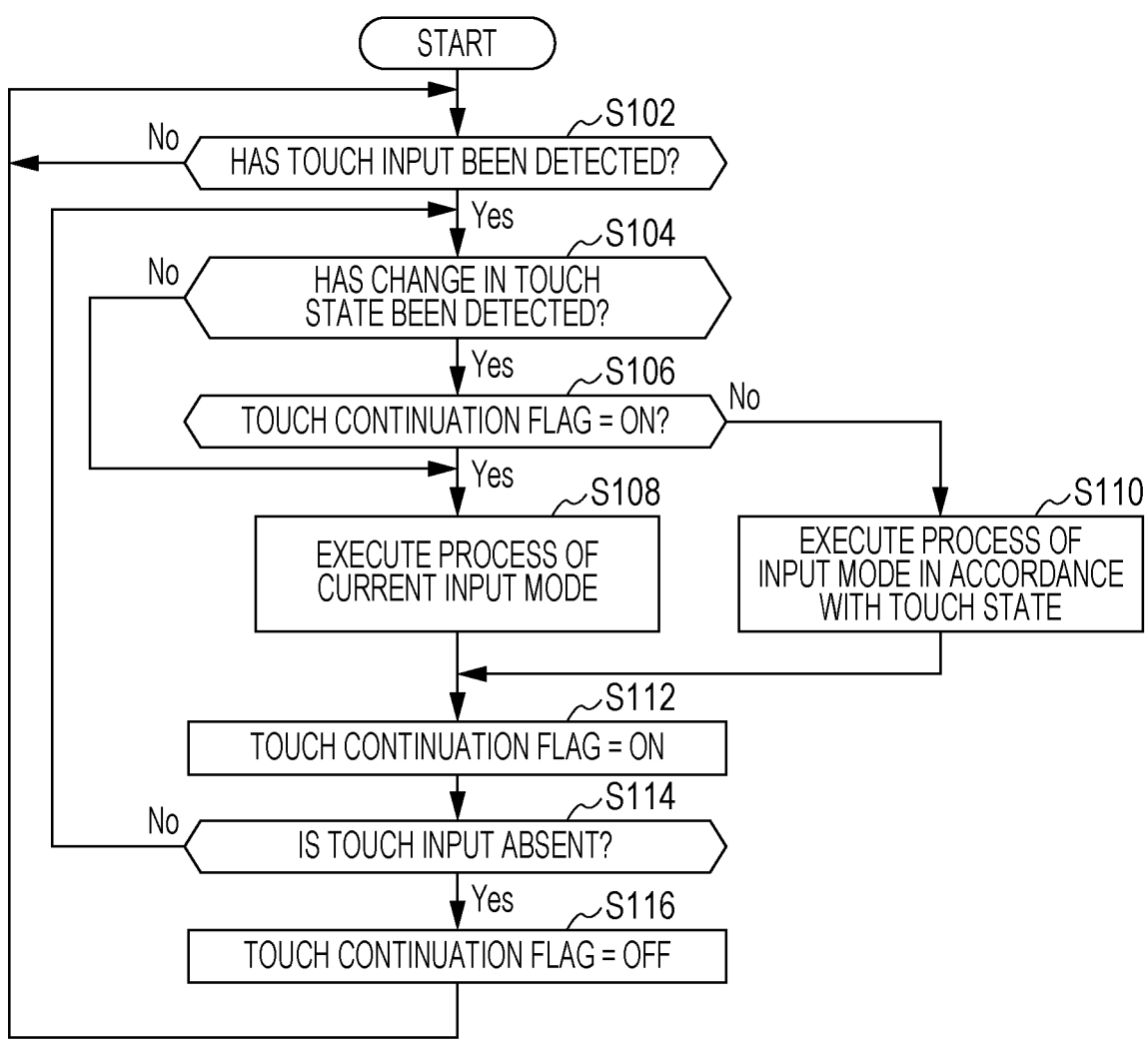
FIG. 2 is a flowchart illustrating an operation flow according to the first embodiment.

Next, a process flow in this embodiment will be described. First, a basic operation will be described with reference to FIG. 2.

First, it is determined whether a touch input has been detected (step S102). If a touch input has been detected (step S102; YES), the touch state is determined in accordance with the touch input, and it is determined whether a change has been made in the determined touch state (step S104).

In this step, the operation to determine whether a change has been made in the touch state is executed by determining whether the touch state determined on the basis of the touch input has exceeded a threshold. In addition, it is also determined that a change has been made at the initial touch.

If a change has been made, it is determined whether a current touch continuation flag is "ON" (step S104; YES→step S106). The touch continuation flag is a flag used to determine whether a user is continuously performing a touch input on the touch panel. The touch continuation flag is "OFF" at the initial setting.

If the touch continuation flag is "OFF", a process of the input mode in accordance with the touch state is executed (step S106; NO→step S110). Consequently, the touch continuation flag becomes "ON" (step S112).

On the other hand, if the touch continuation flag is "ON", regardless of the change in the touch state, the process of the current input mode is executed (step S106; YES→step S108). Note that the touch continuation flag is subsequently changed to "ON" in step S112 in FIG. 2. However, this process may be skipped.

As long as the touch input is continued, that is, as long as the touch input is not absent, the process is repeatedly executed from step S104 (step S114; NO→step S104).

Here, if the touch input is not present any longer, that is, if a user releases a pen or a hand from the touch panel, the touch continuation flag is changed to "OFF", and the process is repeated from step S102 (step S114; YES→step S116→step S102).

That is, according to this process, even if the touch state has been changed in the middle of an operation (e.g., if the area or the density of touch points has changed beyond the threshold), while a user is performing the operation (while the touch is continued), the mode that has been determined first can be maintained until the end of the touch operation (until the finger is released from the touch panel).

Note that it is determined in the above-described process whether a user is touching the touch panel, that is, whether the touch state is continued, by using the touch continuation flag for the sake of description. However, the flag is not necessarily used. For example, by acquiring a signal that is output from the touch panel, it may be determined whether a touch input is performed. This determination may be used to determine whether the touch state is continued at each time.

1.3. Operation Example

Next, an operation example will be described with reference to drawings.

Figure 3A:
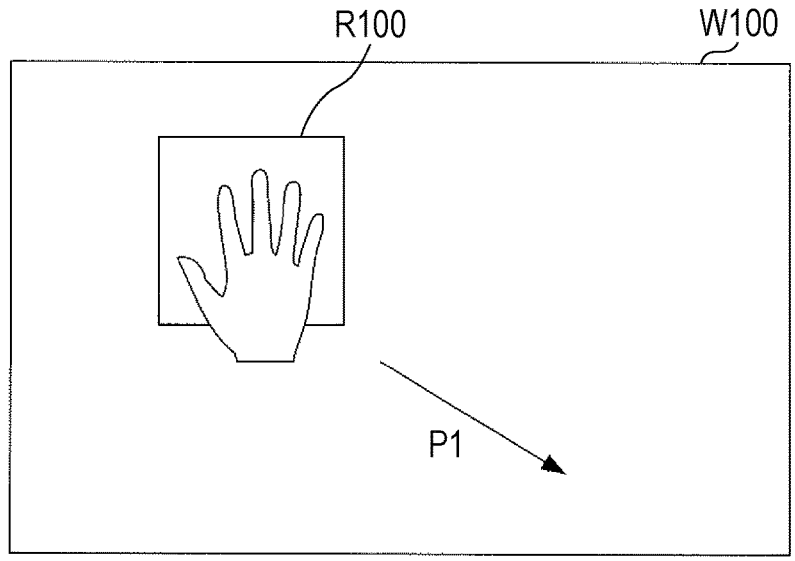
FIGS. 3A to 3C are diagrams illustrating an operation example according to the first embodiment.
Figure 3B:
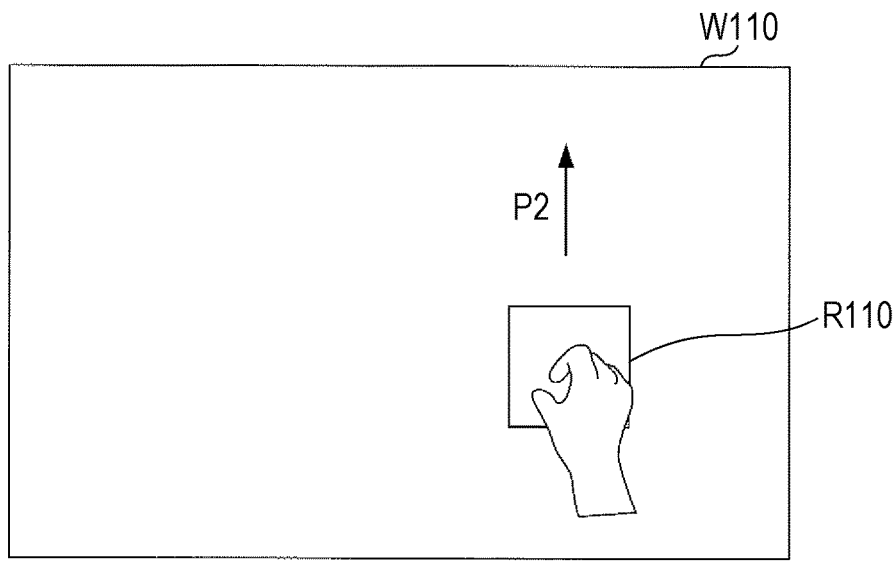
Figure 3C:
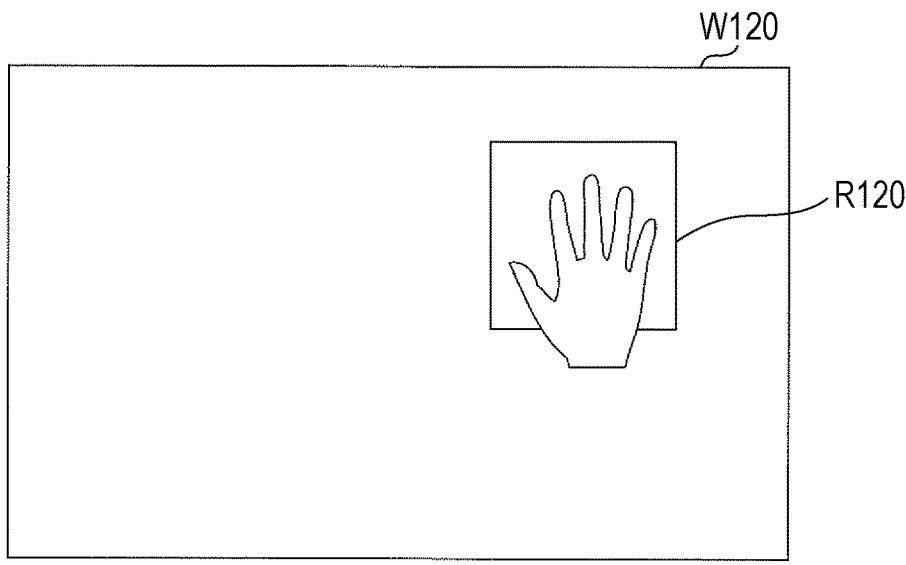

FIGS. 3A to 3C are diagrams illustrating a state where a user is operating the touch panel 120. In FIG. 3A, a touch input is performed at several points on a display screen W100. On the basis of the area of the touch state at this time or the density of input points of the touch input, it is determined that the input mode is the erase mode. Then, an eraser is displayed in an erasing region R100.

FIG. 3B illustrates an operation after having the fingers moved and pinched in a P1 direction in FIG. 3A. On a display screen W110 in FIG. 3B, an erasing region R110 is small in accordance with the user's touch operation.

At this time, in the related art, on the basis of the area of the touch state or the density of the touch detection points, it is determined that the input mode is the palm cancel mode, and the erase mode is canceled. That is, the erasing region R110 disappears from the display, and an operation for erasing an object is invalidated.

In this embodiment, in contrast, once it is determined that the input mode is the erase mode, the user performs the operation with the touch state maintained, and thus, the erase mode is executed. Thus, it is possible to display a desired small erasing region (a small eraser).

In addition, FIG. 3C illustrates a state after having the fingers moved and pinched out in a P2 direction in FIG. 3B. On a display screen W120 in FIG. 3C, a large erasing region R120 is displayed by being moved in the P2 direction.

In this way, according to this embodiment, as long as the user continues the touch operation, a process of the input mode in accordance with the changed touch state can be executed with the initially determined input mode maintained. That is, a restricted mode is set in which the switching of input modes is restricted so as not to be switched to other input modes.

Note that the above-described embodiment has illustrated the erase mode as the initial input mode (i.e., a first input mode) and the palm cancel mode as an input mode that is changed thereafter (i.e., a second input mode). However, other modes may be used.

For example, the initial input mode may be the drawing mode, and the input mode that is changed thereafter may be the erase mode. In this case, even if the user performs a drawing operation and the touch state thereafter is changed to a condition of the erase mode, the drawing mode is maintained, and the drawing can be prevented from being unintentionally erased.

When the user completes the touch, that is, after the user has released the hand or the pen from the touch panel surface, the restricted state is released (reset), and the switching of the input modes becomes valid.

2. Second Embodiment

Next, a second embodiment will be described. In the second embodiment, an embodiment of a case where the input modes have priorities will be described.

Figure 4:
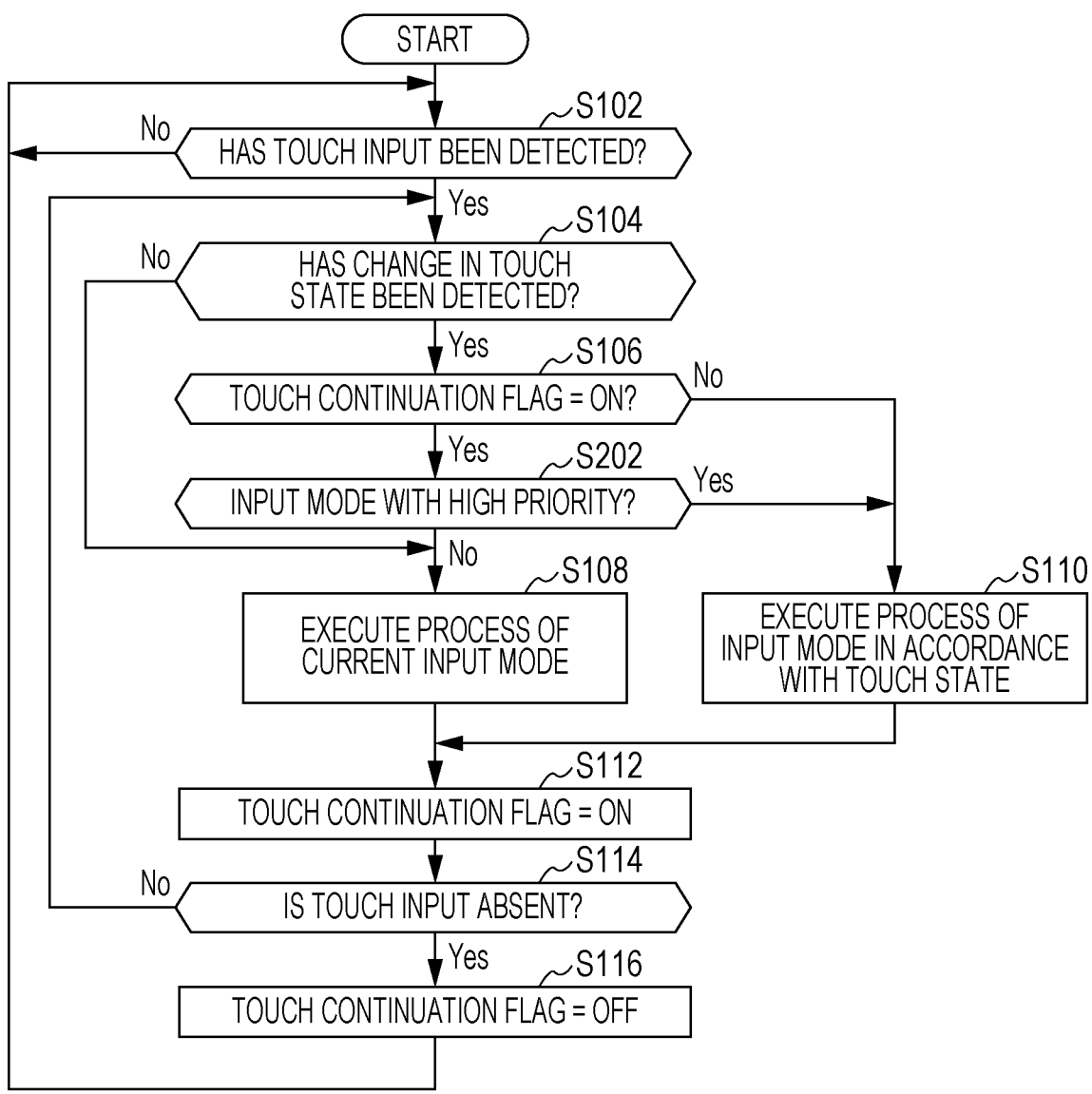
FIG. 4 is a flowchart illustrating an operation flow according to a second embodiment.

An operation flow according to the second embodiment will be described with reference to FIG. 4. FIG. 4 in the second embodiment is a process flow in which step S202 is added to the operation flow described in the first embodiment with reference to FIG. 2. The same process as that in the first embodiment is denoted by the same reference numeral, and the description thereof will be omitted.

In the second embodiment, priorities are assigned to the input modes. For example, the following priorities are assigned.

Priority (high): Erase mode
Priority (normal): Palm cancel mode
Priority (low): Drawing mode In this case, for example, in a case where the initial input mode (the first input mode) is the erase mode, since the priority thereof is the highest, even if the palm cancel mode or the drawing mode is detected as the second input mode on the basis of the detected touch state during the execution of the erase mode, the input mode is not switched. Instead, the current input mode is maintained, and the process is continuously executed (for example, step S202; NO→step S108).

However, in a case where the initial input mode (the first input mode) is the palm cancel mode, if the erase mode is detected as the second input mode on the basis of the detected touch state, since the erase mode has a higher priority, the input mode is switched from the palm cancel mode to the erase mode (for example, step S202; YES→step S111).

In this way, according to this embodiment, since the plurality of input modes are stored (managed) in association with the priorities, the process can be implemented in such a manner that the input mode is not switched to a low-priority mode but is switched to a high-priority mode.

3. Third Embodiment

Figure 5:
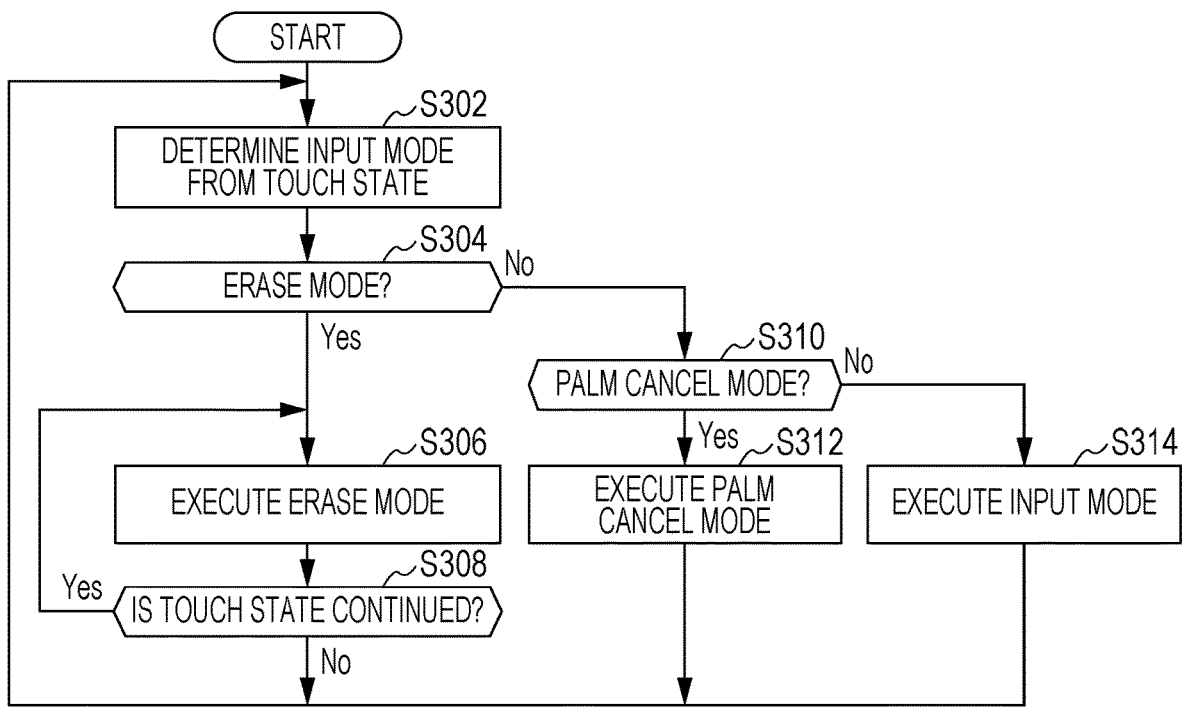
FIG. 5 is a flowchart illustrating an operation flow according to a third embodiment.

Next, a third embodiment will be described with reference to FIG. 5. In the third embodiment, in a case where the erase mode is executed, while the touch operation is continued, the erase mode is continuously executed.

First, the input mode is determined on the basis of the touch state (step S302). Then, on the basis of the input touch state, it is determined whether the corresponding input mode is the erase mode (step S304).

If the input mode is the erase mode, the erase mode is executed (step S304; YES→step S306). Here, as long as the touch state is continued, the erase mode is continuously executed (step S308; YES→step S306).

That is, even if the touch point is changed and the touch state is changed during the execution, an erasing region having an area in accordance with the touch state is displayed on the screen to erase an object. Thus, the erase mode is executed, and the erase mode is continuously executed until the release of the touch state.

If the input mode is the palm cancel mode instead of the erase mode, the palm cancel mode is executed (step S304; YES→step S310; YES→step S312). On the other hand, if the input mode is neither the erase mode nor the palm cancel mode, the input mode in accordance with the current touch state is executed (step S314).

In this way, according to this embodiment, the input mode determined on the basis of the touch state is executed. At this time, in a case of the erase mode, even if the touch state is changed thereafter, the erase mode is continuously executed until the release of the touch state.

4. Fourth Embodiment

Figure 6:
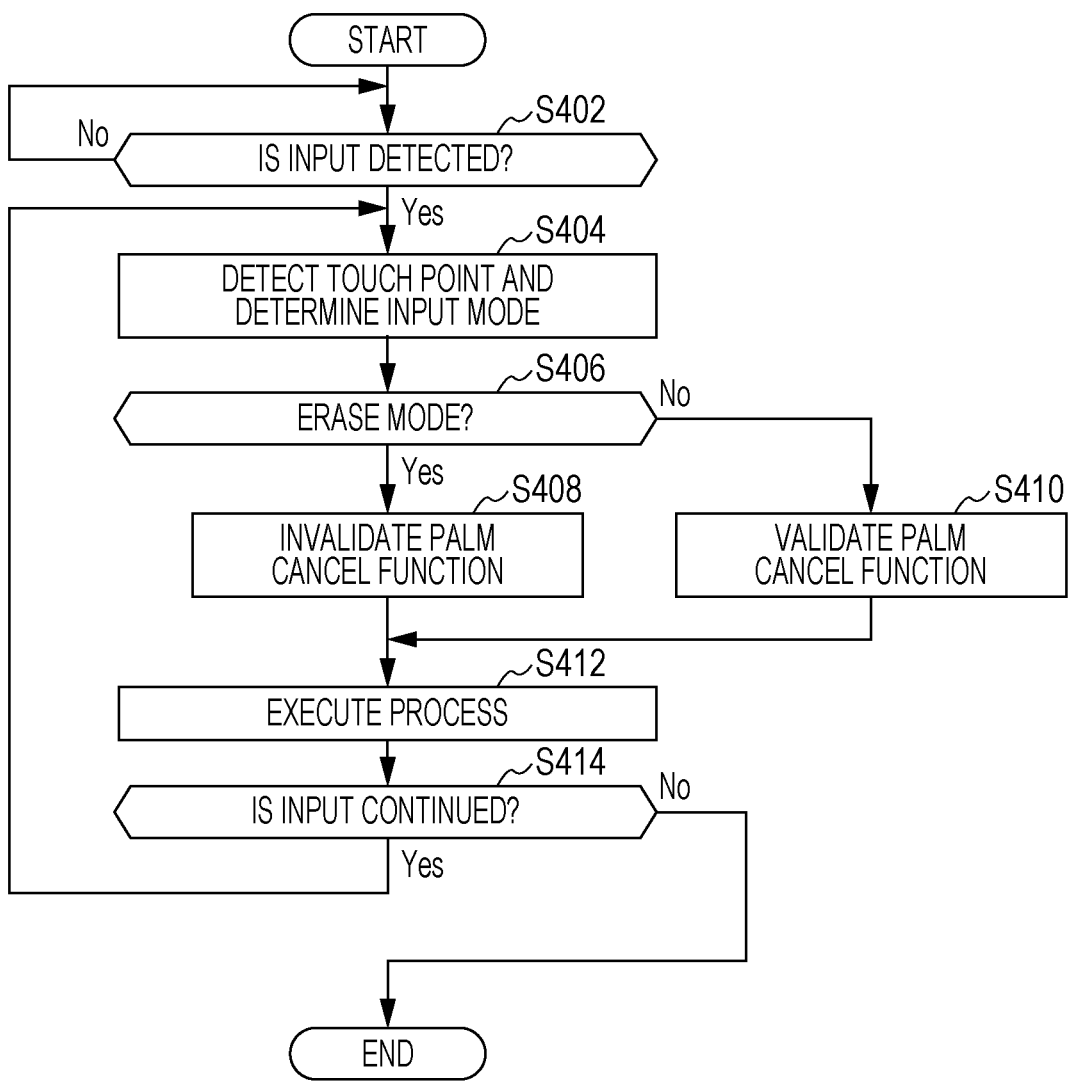
FIG. 6 is a flowchart illustrating an operation flow according to a fourth embodiment.

Next, a fourth embodiment will be described with reference to FIG. 6. Although the above embodiments have described a case where all the functions are executed as the input modes, this embodiment describes a case where some of the functions are not executed as the input modes.

First, in a case where a user performs an input operation on the touch panel 120 (step S402; YES), the input point is detected, and the input mode is determined (step S404). That is, in a case where the operation detecting unit 121 detects a user operation, the detected information is output to the touch-state determining unit 131, and thereby the input point is detected. In addition, on the basis of the detected input point, the input-mode determining unit 132 determines the input mode.

Subsequently, if the determined input mode is the erase mode, the palm cancel function is turned off (invalidated) (step S406; YES→step S408). If the input mode is other than the erase mode, the palm cancel function is turned on (validated) (step S406; NO→step S410).

Subsequently, a process based on the input operation is executed (step S412). That is, on the basis of the output from the touch-state determining unit 131 and the determination by the input-mode determining unit 132, the input-information output unit 133 outputs information to the control unit 100, and the control unit 100 executes a specific process.

For example, in a case where the input-mode determining unit 132 has determined that the input mode is the drawing mode, the input-information output unit 133 outputs information based on input points detected by the touch-state determining unit 131 to the control unit 100, and thereby a process of drawing a line on the display unit 110 is executed. Since the palm cancel function is in an on-state at this time, the coordinates of the dead region are not output to the control unit 100, and a line based on the coordinates included in the dead region is not drawn.

In addition, in a case where the input mode is the erase mode, a process of erasing a line that is already drawn on the basis of the input points is executed. Since the palm cancel function is in an off-state at this time, even if a region where the density of the input points is extremely high is generated as a result of pinching of a user's fingers during an operation with the fingers, the region does not serve as the dead region.

Subsequently, if the user's input is continued on the touch panel 120, the process returns to step S404, and a process in accordance with the input is continuously executed (step S414; YES→step S404). If the input is completed, this process ends (step S414; NO).

Figure 7A:
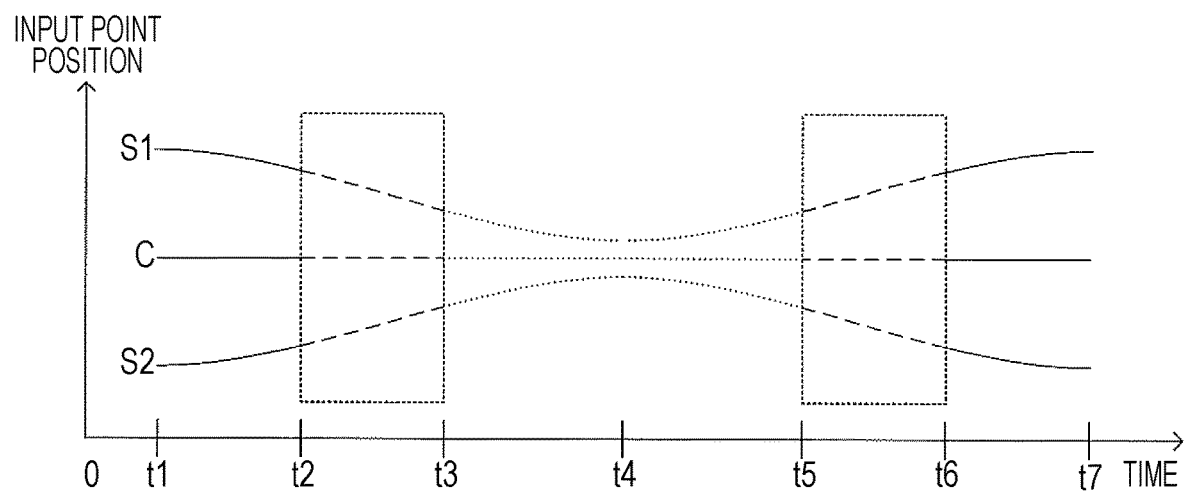
FIGS. 7A and 7B are graphs illustrating an operation example according to the fourth embodiment.
Figure 7B:
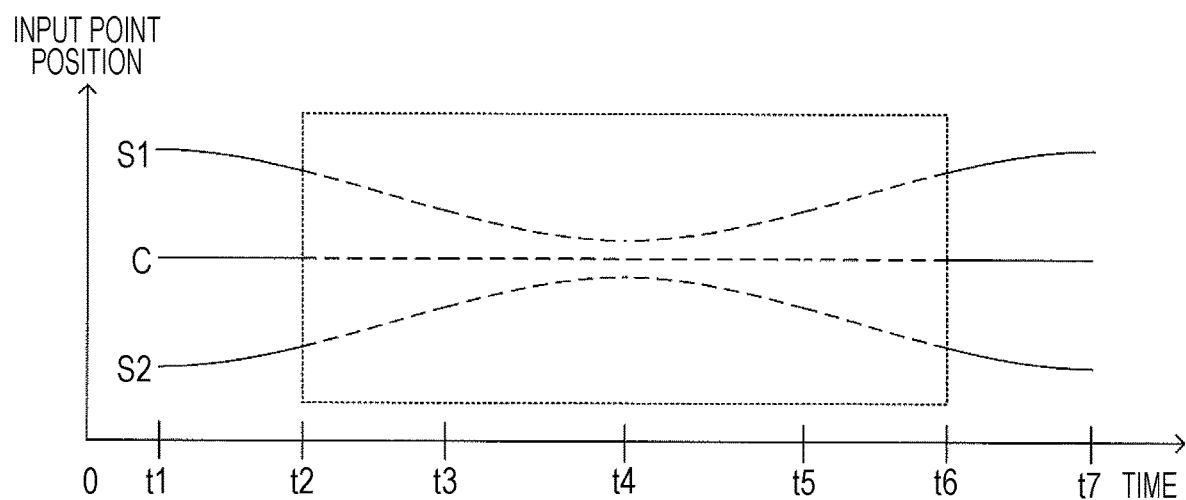

Next, the relationship between the input points and the mode to be switched will be described with reference to FIGS. 7A and 7B. FIGS. 7A and 7B are graphs in which the vertical axis and the horizontal axis respectively represent the positional relationship of the input points and the time in a case where the touch panel 120 is touched by three fingers. In this example, among the touched three fingers, an input point of the center finger is denoted by C, and input points of the fingers at both sides are denoted by S1 and S2. That is, each of the graphs illustrated in FIGS. 7A and 7B illustrates the following operation: a touch operation is performed with three fingers at time t1, the fingers on both sides approach the center finger from time t1 to time t4, the side fingers return to the original positions from time t4 to time t7, and the operation is completed at time t7.

FIG. 7A illustrates an operation of a display apparatus of the related art. First, from time t1 to time t2, the density of the input points is low, and it is determined that the input mode is the drawing mode. Subsequently, from time t2 to time t3, the density of the input points equals to the density for determining that the input mode is the erase mode, but is not an extremely high density. Thus, a process of the erase mode is executed.

However, from time t3 to time t5, the density of the input points is extremely high. Accordingly, the palm cancel function causes a region including the input points to serve as the dead region. Thus, a process of the erase mode is not executed.

Subsequently, the density of the input points is decreased as the fingers return to their original positions. From time t5 to time t6, a process of the erase mode is executed again. In addition, from time t6 to time t7, a process of the drawing mode is executed.

Thus, in the operation of the display apparatus of the related art, the erase mode and the palm cancel function compete with each other, and it is not possible to continue the erase mode. This behavior damages the operability.

FIG. 7B illustrates an operation of the display apparatus 10 according to this embodiment. As in FIG. 7A, from time t2 to time t3, it is determined that the density of the input points is the density for the erase mode. However, the palm cancel function is in the off-state at this time. Accordingly, although the density of the input points is extremely high from time t3 to time t5, the region including the input points does not serve as the dead region.

Thus, according to this embodiment, a process of the erase mode can be continuously executed from time t2 to time t6, making the operability stable.

5. Fifth Embodiment

Next, a fifth embodiment will be described. The fifth embodiment describes a case where the input mode is set in accordance with the area and the density of a target that is touched. Note that the other embodiments will be referred to for the parts that are common to those in the other embodiments, and the description thereof will be omitted.

For example, FIG. 8 is a diagram illustrating the input modes in association with the area and the density. First, in a case where the area of the touch region is greater than or equal to 300 $mm^2$, if the density of a touch in the region is less than 10%, it is determined that the input mode is the erase mode; if the density is greater than or equal to 10%, it is determined that the input mode is the palm cancel mode. In a case where the area of the touch region is less than 300 $mm^2$, if the density of a touch in the region is less than 10%, it is determined that the input mode is the drawing mode (pen); if the density is greater than or equal to 10%, it is determined that the input mode is determined to the drawing mode (finger).

The density can be determined on the basis of the number of detection points that are detected and included in a predetermined region. For example, in a case of a 70-inch touch panel, the 4k definition (UHD) is 3840×2160 dots. In addition, the size of an LCD is 1330×748 mm, and the diameter of a point to be detected per dot is approximately 0.35 mm.

In order to obtain a density of a touch region having an area of 300 mm, the numbers of detection points included in square regions whose side is approximately 17.3 mm long are compared with each other. In each region, 16×16=256 points can be detected at the same time.

Here, as the density determination, in a case where the number of detection points that are detected is 26 or more, it is determined that the density is 10% or more; in a case where the number of detection points is 25 or less, it is determined that the density is less than 10%.

In this way, determination of the input mode in accordance with the area and the density is enabled as illustrated in FIG. 8.

6. Sixth Embodiment

Next, a sixth embodiment will be described. The sixth embodiment describes a case in which the input mode is set in accordance with the signal intensity of a touch. Note that the other embodiments will be referred to for the parts that are common to those in the other embodiments, and the description thereof will be omitted.

For example, FIG. 9 illustrates a diagram illustrating the input modes in association with the area and the signal intensity. First, in a case where the touch region has an area of 300 mm$^2$ or more, if the signal intensity of a touch is less than 500, the touch is invalid; if the signal intensity of a touch is greater than or equal to 500 and less than 2000, it is determined that the input mode is the erase mode; and if the signal intensity of a touch is greater than or equal to 2000, it is determined that the input mode is the palm cancel mode. In addition, in a case where the touch region has an area of less than 300 mm$^2$, if the signal intensity of a touch is less than 500, the touch is invalid; if the signal intensity of a touch is greater than or equal to 500 and less than 2000, it is determined that the input mode is the drawing mode (pen); and if the signal intensity of a touch is greater than or equal to 2000, it is determined that the input mode is the drawing mode (finger).

Figures 10, 11:
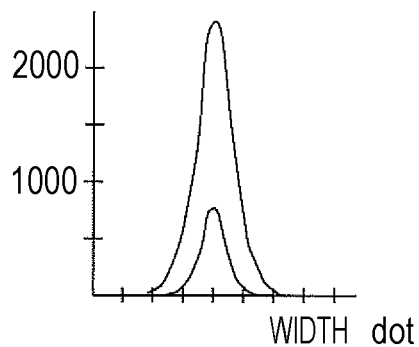
FIG. 10 is a diagram illustrating the sixth embodiment.
FIG. 11 is a diagram illustrating a seventh embodiment.

Now, an example of the signal intensity is illustrated in FIG. 10. The signal intensity is a value that is represented in 16 bits at most, and 0 to 65535 is output. This is a graph indicating that the signal intensity (static capacitance) to be detected varies depending on the conductivity of a touched object. The higher mountain indicates an example of a finger touch, and the lower mountain indicates an example of a pen touch (conductive material). It is possible to identify the touched object as a finger or a pen depending on the magnitude of the signal intensity.

In this way, according to this embodiment, it is possible to determine the input mode by using the area and the signal intensity of a touch.

7. Seventh Embodiment

Next, a seventh embodiment will be described. In the seventh embodiment, the switching of the input modes is determined in accordance with a change in the touch state and the priority. Note that the other embodiments will be referred to for the parts that are common to those in the other embodiments, and the description thereof will be omitted.

In this example, a rule may be set for how to switch the input modes in accordance with a change in the touch state.

For example, FIG. 11 illustrates whether it is possible to switch the input modes in a touch region.

For example, if the input mode before change (the current input mode) is the drawing mode and is changed to the erase mode, this switching is set to be allowed ("YES"). In this case, in accordance with the touch state, the input modes are switched from the drawing mode to the erase mode.

In contrast, if the input mode before change (the current input mode) is the erase mode but it is determined that the input mode is changed to the palm cancel mode on the basis of the touch state, the switching is set to be rejected ("NO"). Thus, the erase mode is maintained as the input mode without change.

In this way, according to this embodiment, it is possible to set whether the input modes can be switched in accordance with the touch state. Note that it may be set by a user or may be set in advance whether the switching is possible.

8. Eighth Embodiment

Next, an eighth embodiment will be described. The eighth embodiment describes a case where the input mode is determined on the basis of determination in another touch region. Note that the other embodiments will be referred to for the parts that are common to those in the other embodiments, and the description thereof will be omitted.

For example, in a case of an input with a pen, the following two cases are assumed.

(1) After a touch of the tip of a pen (pen touch: first touch), a palm is touched (palm touch: second touch).

(2) After a touch of a palm (first touch), a pen is touched (second touch).

In a case where the input mode of the second touch is determined at this time, the input mode of the first touch is determined. For example, in a case where the first touch is a pen touch, the input of the second touch itself is invalidated. That is, the input of the palm cancel mode itself is canceled.

At this time, any input of the second touch may be canceled, or a specific input mode or specific input modes may be canceled. In addition, the second touch may be invalidated if the second touch is made after the first touch within a predetermined period or if the distance between the first touch and the second touch is close.

If a palm is touched first (the first touch) and it is determined that the input mode is the palm cancel mode, a touch that is input by the second touch remains valid. For example, since the first touch is a palm touch, it is determined that the input mode is the palm cancel mode, and a pen touch may be input as the second touch.

In this way, according to this embodiment, the input mode of a region to be determined may be determined on the basis of the input mode of the region to be determined and the input mode of a difference region.

9. Modifications

The embodiments of the disclosure have been described above in detail with reference to the drawings. However, specific configurations are not limited to these embodiments, and designs or the like without departing from the spirit of the disclosure are also included in the claims.

Programs that operate in the respective apparatuses in the embodiments are programs that control the CPU and the like (programs causing a computer to function) so as to implement the functions of the above-described embodiments. In addition, information handled in these apparatuses is temporarily stored in a temporary storage apparatus (e.g., random access memory (RAM)) at the time of a process, then stored in a storage apparatus such as a read only memory (ROM), a hard disk drive (HDD), or a solid state drive (SSD), and read, corrected, or written by the CPU as needed.

A program may be commercially circulated by being stored in a portable recording medium or transferred to a server apparatus computer connected through a network such as the Internet. In this case, a storage apparatus of the server apparatus computer is included in the disclosure.

The present disclosure contains subject matter related to that disclosed in Japanese Priority Patent Application JP 2017-203155 filed in the Japan Patent Office on Oct. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input apparatus comprising:
a memory that stores instructions; and
a processor that executes the instructions stored in the memory to:
    detect a touch operation;
    determine a touch state in the touch operation;
    set a plurality of input modes in accordance with the touch state, the input modes including at least an erase mode and a palm cancel mode;
    determine any one input mode from among the set input modes on the basis of the determined touch state; and
    execute an input process on the basis of the detected touch operation in the determined input mode,
wherein the touch state is determined by using an area and/or a density of the touch operation,
wherein the input mode is set as the erase mode if the touch state is less than or equal to a determination threshold and that the input mode is set as the palm cancel mode if the touch state is greater than the determination threshold, and
wherein, in a case where the determined input mode is changed by a change in the touch state between a start time of the touch operation and an end time of the touch operation, if the change is from the erase mode to the palm cancel mode, even after the change in the input mode, the erase mode is maintained and the input process in the erase mode is executed.

2. An input apparatus comprising:
a memory that stores instructions; and
a processor that executes the instructions stored in the memory to:
    detect a touch operation;
    a touch state in the touch operation;
    set a plurality of input modes in accordance with the touch state, the input modes including at least an erase mode and a palm cancel mode;
    determine any one input mode from among the set input modes on the basis of the determined touch state; and
    execute an input process on the basis of the detected touch operation in the determined input mode,
wherein, in a case where, between a start time of a touch operation at a first position and an end time of the touch operation, a new touch operation is detected at a second position that is away from the first position, if it is determined that the input modes are the erase mode at the first position and the palm cancel mode at the second position, even after the detection of the new touch operation, the process executing unit maintains the erase mode and executes the input process in the erase mode.

3. The input apparatus according to claim 2,
wherein, if the erase mode is maintained, an input at the second position is invalidated.

4. The input apparatus according to claim 1,
wherein sets an input mode is set in accordance with any one or a combination of two or more of a density, an area, and a signal intensity of the touch operation as the touch state.

5. The input apparatus according to claim 1,
wherein the plurality of input modes have priorities that are set,
wherein the erase mode has a higher priority than the palm cancel mode, and
wherein, in a case where the determined input mode is changed by the change in the touch state between the start time of the touch operation and the end time of the touch operation, if the priority of an input mode before change is higher than the priority of an input mode after change, even after the change in the input mode, the input mode before change is maintained and the input process in the input mode before change is executed.

6. The input apparatus according to claim 1,
wherein, in the plurality of input modes, switching of the input modes is set to be valid or invalid for a change between the respective input modes,
wherein the switching of the input modes from the erase mode to the palm cancel mode is set to be invalid, and
wherein, in a case where the determined input mode is changed by the change in the touch state between the start time of the touch operation and the end time of the touch operation, if switching from an input mode before change to an input mode after change is set to be invalid, even after the change in the input mode, the input mode before change is maintained and the input process in the input mode before change is executed.

7. The input apparatus according to claim 5,
wherein, if the input mode before change is not maintained, the input process in the input mode after change is executed.

8. The input apparatus according to claim 2,
wherein the plurality of input modes have priorities that are set,
wherein the erase mode has a higher priority than the palm cancel mode, and
wherein, in a case where, between the start time of the touch operation at the first position and the end time of the touch operation, the new touch operation is detected at the second position that is away from the first position, when the priority of an input mode determined at the first position is higher than the priority of an input mode determined at the second position, even after the detection of the new touch operation, the input mode determined at the first position is maintained and the input process in the input mode determined at the first position is executed.

9. The input apparatus according to claim 2,
wherein, in the plurality of input modes, switching of the input modes is set to be valid or invalid for a change between the respective input modes,
wherein the switching of the input modes from the erase mode to the palm cancel mode is set to be invalid, and wherein, in a case where, between the start time of the touch operation at the first position and the end time of the touch operation, the new touch operation is detected at the second position that is away from the first position, if switching from an input mode determined at the first position to an input mode determined at the second position is set to be invalid, even after the detection of the new touch operation, the input mode determined at the first position is maintained and the input process in the input mode determined at the first position is executed.

10. The input apparatus according to claim 8,
wherein, if the input mode determined at the first position is not maintained, the input process in the input mode determined at the second position is executed.

11. An input apparatus comprising:
a memory that stores instructions; and
a processor that executes the instructions stored in the memory to:
  detect a touch operation; and
  detect a touch state on the basis of the detected touch operation and determine any one input mode from among a plurality of input modes on the basis of the touch state,
wherein the touch state is determined by using an area and/or a density of the touch operation,
wherein the input mode is set as an erase mode if the touch state is less than or equal to a determination threshold and that the input mode is set as a palm cancel mode if the touch state is greater than the determination threshold, and
wherein, if the touch state is changed while the touch operation is being detected, the input-mode determining unit maintains the determined input mode.

12. An input apparatus comprising:
a memory that stores instructions; and
a processor that executes the instructions stored in the memory to:
  detect a touch operation; and
  detect a touch state on the basis of the detected touch operation and determine any one input mode from among a plurality of input modes on the basis of the touch state,
wherein the touch state is determined by using an area and/or a density of the touch operation,
wherein the input mode is set as an erase mode if the touch state is less than or equal to a determination threshold and that the input mode is set as a palm cancel mode if the touch state is greater than the determination threshold, and
wherein, if a new touch state is detected at a portion that is different from a portion where the touch operation has been detected while the touch operation is being detected, the input-mode determining unit maintains the determined input mode.

13. The input apparatus according to claim 11,
wherein, if it is determined that the input mode is the erase mode when the touch operation is initially detected, the erase mode is maintained even after the touch state has become less than or equal to the determination threshold between a start time of the touch operation and an end time of the touch operation.

14. A non-transitory computer-readable recording medium storing a program for causing a computer to execute instructions to:
detect a touch operation;
determine a touch state in the touch operation;
set a plurality of input modes in accordance with the touch state, the input modes including at least an erase mode and a palm cancel mode;
determine any one input mode from among the set input modes on the basis of the determined touch state; and
execute an input process on the basis of the detected touch operation in the determined input mode,
wherein the touch state is determined by using an area and/or a density of the touch operation,
wherein the input mode is set as the erase mode if the touch state is less than or equal to a determination threshold and that the input mode is set as the palm cancel mode if the touch state is greater than the determination threshold, and
wherein, in a case where the determined input mode is changed by a change in the touch state between a start time of the touch operation and an end time of the touch operation, if the change is from the erase mode to the palm cancel mode, even after the change in the input mode, the erase mode is maintained, and the input process in the erase mode is executed.

15. A non-transitory computer-readable recording medium storing a program for causing a computer to execute instructions to:
detect a touch operation;
determine a touch state in the touch operation;
set a plurality of input modes in accordance with the touch state, the input modes including at least an erase mode and a palm cancel mode;
determine any one input mode from among the set input modes on the basis of the determined touch state; and
execute an input process on the basis of the detected touch operation in the determined input mode,
wherein the touch state is determined by using an area and/or a density of the touch operation,
wherein the input mode is set as the erase mode if the touch state is less than or equal to a determination threshold and that the input mode is set as the palm cancel mode if the touch state is greater than the determination threshold, and
wherein, in a case where, between a start time of a touch operation at a first position and an end time of the touch operation, a new touch operation is detected at a second position that is away from the first position, if it is determined that the input modes are the erase mode at the first position and the palm cancel mode at the second position, even after the detection of the new touch operation, the erase mode is maintained, and the input process in the erase mode is executed.

16. A non-transitory computer-readable recording medium storing a program for causing a computer to execute instructions to:
detect a touch operation; and
detect a touch state on the basis of the detected touch operation and determine a plurality of input modes on the basis of the touch state,
wherein the touch state is determined by using an area and/or a density of the touch operation,
wherein the input mode is set as an erase mode if the touch state is less than or equal to a determination threshold and that the input mode is set as a palm cancel mode if the touch state is greater than the determination threshold, and
wherein, if the touch state is changed while the touch operation is being detected, the input-mode determining function maintains the determined input mode.

17. A non-transitory computer-readable recording medium storing a program for causing a computer to execute instructions to:
- detect a touch operation; and
- detect a touch state on the basis of the detected touch operation and determine a plurality of input modes on the basis of the touch state,
- wherein the touch state is determined by using an area and/or a density of the touch operation,
- wherein the input mode is set as an erase mode if the touch state is less than or equal to a determination threshold and that the input mode is set as a palm cancel mode if the touch state is greater than the determination threshold, and
- wherein, if a new touch state is detected at a portion that is different from a portion where the touch operation has been detected while the touch operation is being detected, the input-mode determining function maintains the determined input mode.

\* \* \* \* \*